(12) United States Patent
Bruce et al.

(10) Patent No.: US 7,543,992 B2
(45) Date of Patent: Jun. 9, 2009

(54) HIGH TEMPERATURE ROD END BEARINGS (75) Inventors: Robert William Bruce, Loveland, OH (US); Jerry Donald Schell, Evendale, OH (US); Charles J. Beall, Peachtree City, GA (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 11/244,343

(22) Filed: Oct. 5, 2005

(65) Prior Publication Data

US 2006/0245676 A1 Nov. 2, 2006

Related U.S. Application Data (60) Provisional application No. 60/675,572, filed on Apr. 28, 2005.

(51) Int. Cl.
*F16C 11/06* (2006.01)
*F16C 25/06* (2006.01)

(52) U.S. Cl. .................. 384/209; 384/192; 384/207

(58) Field of Classification Search ......... 384/206–212, 384/491–492, 109, 192, 565; 28/898.043, 28/898.059, 898.061; 428/627, 683, 698
See application file for complete search history.

(56) References Cited

U.S. PATENT DOCUMENTS

| | | | | |
|---|---|---|---|---|
| 2,827,340 A | * | 3/1958 | Johnson | .............. 384/209 |
| 3,097,005 A | | 7/1963 | Fickler | |
| 3,428,374 A | | 2/1969 | Orkin et al. | |
| 3,528,539 A | * | 9/1970 | Speaker et al. | ...... 198/370.04 |
| 3,535,006 A | * | 10/1970 | Hudacko et al. | ......... 384/206 |
| 3,567,504 A | | 3/1971 | Hopkins et al | |
| 3,601,414 A | | 8/1971 | Rao | |
| 3,620,799 A | | 11/1971 | Hoelscher et al. | |
| 3,623,736 A | | 11/1971 | Petrie et al. | |
| 3,623,981 A | | 11/1971 | Giltrow et al. | |
| 3,633,926 A | | 1/1972 | Cullercoats et al. | |
| 3,689,178 A | | 9/1972 | Faber et al. | |
| 3,695,777 A | | 10/1972 | Westphal et al. | |
| 3,711,171 A | | 1/1973 | Orkin et al. | |

(Continued)

FOREIGN PATENT DOCUMENTS

EP    0 207 915 A1    1/1987

(Continued)

*Primary Examiner*—Marcus Charles
(74) *Attorney, Agent, or Firm*—McNees Wallace & Nurick, LLC (57) ABSTRACT A rod end bearing comprising a body comprising a ring portion and a rod portion. The ring portion comprises a ring having an opening, the opening having a center axis. The rod portion comprises a first rod extending radially from the ring in a direction perpendicular to the center axis. The opening having a geometry sufficient to support a substantially spherical ball bearing, and permit rotation of the ball bearing inside the ring. The inner periphery of the ring is in contact with the ball bearing and includes a wear coating. An antifriction coating is disposed on a surface selected from the group consisting of a surface of the wear coating, a surface of the ball bearing and combinations thereof. The antifriction coating maintains a coefficient of friction between the wear coating and the ball bearing of up to about 0.95 in atmospheres substantially devoid of water vapor.

20 Claims, 6 Drawing Sheets

U.S. PATENT DOCUMENTS

| | | |
|---|---|---|
| 3,719,427 A | 3/1973 | Davis |
| 3,725,276 A | 4/1973 | Ohkage |
| 3,746,408 A * | 7/1973 | Wachter et al. ............. 384/207 |
| 3,759,589 A * | 9/1973 | Rozentals ................... 384/207 |
| 3,764,189 A | 10/1973 | Prostler et al. |
| 3,788,763 A | 1/1974 | Nickles |
| 3,817,719 A | 6/1974 | Schiike et al. |
| 3,821,111 A | 6/1974 | Abe et al. |
| 3,845,994 A | 11/1974 | Trey |
| 3,873,168 A | 3/1975 | Viola et al. |
| 3,879,301 A | 4/1975 | Cairns |
| 3,879,831 A | 4/1975 | Rigney et al. |
| 3,909,424 A | 9/1975 | Clark |
| 3,966,352 A | 6/1976 | White et al. |
| 3,969,113 A | 7/1976 | Miyatuka |
| 3,984,158 A | 10/1976 | Sorensen et al. |
| 4,025,227 A | 5/1977 | Greenberg et al. |
| 4,050,844 A | 9/1977 | Miller et al. |
| 4,059,316 A | 11/1977 | Alvarez et al. |
| 4,105,263 A | 8/1978 | Sorenson et al. |
| 4,109,031 A | 8/1978 | Marscher |
| 4,140,834 A | 2/1979 | Marcantonio et al. |
| 4,163,364 A | 8/1979 | Shirato et al. |
| 4,167,411 A | 9/1979 | Westdale et al. |
| 4,207,658 A | 6/1980 | Sorensen |
| 4,221,545 A * | 9/1980 | Terauchi ................... 417/269 |
| 4,269,903 A | 5/1981 | Clingman et al. |
| 4,302,149 A | 11/1981 | Smale |
| 4,311,432 A | 1/1982 | Kildea |
| 4,314,791 A | 2/1982 | Weiler |
| 4,404,263 A | 9/1983 | Hodes et al. |
| 4,425,247 A | 1/1984 | Bely et al. |
| 4,456,266 A | 6/1984 | Heinold |
| 4,492,522 A | 1/1985 | Rossmann et al. |
| 4,509,803 A | 4/1985 | Takenaka et al. |
| 4,521,496 A | 6/1985 | Sara |
| 4,548,254 A | 10/1985 | Roberts |
| 4,559,248 A | 12/1985 | Sumiyoshi et al. |
| 4,618,269 A | 10/1986 | Badrak et al. |
| 4,619,580 A | 10/1986 | Snyder |
| 4,664,595 A | 5/1987 | Tsuji et al. |
| 4,678,350 A * | 7/1987 | Statz ......................... 384/208 |
| 4,728,448 A | 3/1988 | Sliney |
| 4,733,716 A | 3/1988 | Tominaga et al. |
| 4,808,069 A | 2/1989 | Bonner et al. |
| 4,832,993 A | 5/1989 | Coulon |
| 4,834,613 A | 5/1989 | Hansen et al. |
| 4,834,622 A | 5/1989 | Schuh |
| 4,836,746 A | 6/1989 | Owsianny et al. |
| 4,867,639 A | 9/1989 | Strangman |
| 4,875,532 A | 10/1989 | Langford, Jr. |
| 4,879,052 A | 11/1989 | Mullin |
| 4,910,086 A | 3/1990 | Kawakami et al. |
| 4,913,563 A | 4/1990 | Veronesi et al. |
| 5,064,727 A | 11/1991 | Naik et al. |
| 5,066,540 A | 11/1991 | Mosser et al. |
| 5,066,546 A | 11/1991 | Materkowski |
| 5,100,848 A | 3/1992 | Enomoto et al. |
| 5,141,656 A | 8/1992 | Rountree |
| 5,149,250 A | 9/1992 | Plemmons et al. |
| 5,161,898 A | 11/1992 | Drake |
| 5,162,157 A | 11/1992 | Tanaka et al. |
| 5,222,360 A | 6/1993 | Antuna et al. |
| 5,240,741 A | 8/1993 | Edwards, III et al. |
| 5,244,587 A | 9/1993 | Ito et al. |
| 5,269,798 A | 12/1993 | Winkler |
| 5,277,073 A | 1/1994 | Ruiz et al. |
| 5,281,087 A | 1/1994 | Hines |
| 5,294,355 A | 3/1994 | King et al. |
| 5,308,226 A | 5/1994 | Venkatasubbu et al. |
| 5,352,540 A | 10/1994 | Schienle et al. |
| 5,364,209 A | 11/1994 | Santhanam et al. |
| 5,388,866 A | 2/1995 | Schlosser |
| 5,434,210 A | 7/1995 | Rangaswamy et al. |
| 5,458,460 A | 10/1995 | Okada et al. |
| 5,459,546 A * | 10/1995 | Penn .......................... 355/53 |
| 5,470,494 A | 11/1995 | Umeda |
| 5,507,961 A | 4/1996 | Forster et al. |
| 5,517,817 A | 5/1996 | Hines |
| 5,518,639 A | 5/1996 | Luk et al. |
| 5,536,022 A | 7/1996 | Sileo et al. |
| 5,551,853 A | 9/1996 | Cherry et al. |
| 5,554,309 A | 9/1996 | Bruce et al. |
| 5,560,991 A | 10/1996 | Patel et al. |
| 5,587,217 A | 12/1996 | Chao et al. |
| 5,589,012 A | 12/1996 | Hobby et al. |
| 5,593,275 A | 1/1997 | Venkatasubbu et al. |
| 5,622,473 A | 4/1997 | Payling |
| 5,628,617 A | 5/1997 | Dalton et al. |
| 5,695,326 A | 12/1997 | Oka et al. |
| 5,714,700 A | 2/1998 | Nishida et al. |
| 5,723,800 A | 3/1998 | Yoshimoto et al. |
| 5,725,313 A | 3/1998 | Singh et al. |
| 5,731,045 A | 3/1998 | Dearnaley et al. |
| 5,747,428 A | 5/1998 | Khorramian |
| 5,755,817 A | 5/1998 | Prouty et al. |
| 5,807,072 A | 9/1998 | Payling |
| 5,813,830 A | 9/1998 | Smith et al. |
| 5,829,881 A | 11/1998 | Furlani et al. |
| 5,839,880 A | 11/1998 | Okada et al. |
| 5,856,378 A | 1/1999 | Ring et al. |
| 5,868,398 A | 2/1999 | Maier et al. |
| 5,891,522 A | 4/1999 | Olson |
| 6,068,813 A | 5/2000 | Semel |
| 6,073,537 A | 6/2000 | Noda et al. |
| 6,086,327 A | 7/2000 | Mack et al. |
| 6,093,482 A | 7/2000 | Park et al. |
| 6,102,656 A | 8/2000 | Nissley et al. |
| 6,106,936 A | 8/2000 | Adam |
| 6,129,533 A | 10/2000 | Brandt et al. |
| 6,135,712 A | 10/2000 | Chevrollier et al. |
| 6,139,261 A | 10/2000 | Bishop et al. |
| 6,142,060 A * | 11/2000 | Saito et al. ..................... 92/71 |
| 6,146,093 A | 11/2000 | Lammas et al. |
| 6,164,846 A | 12/2000 | Chatterjee et al. |
| 6,170,990 B1 | 1/2001 | Hawkins |
| 6,177,178 B1 | 1/2001 | Ostlund et al. |
| 6,184,333 B1 | 2/2001 | Gray |
| 6,190,124 B1 | 2/2001 | Freling et al. |
| 6,192,585 B1 | 2/2001 | Buchanan, Jr. et al. |
| 6,209,206 B1 * | 4/2001 | Harris et al. ........... 29/898.043 |
| 6,210,106 B1 | 4/2001 | Hawkins |
| 6,264,369 B1 | 7/2001 | Mesing et al. |
| 6,331,509 B1 | 12/2001 | Heimann et al. |
| 6,350,060 B1 * | 2/2002 | Peterson .................... 384/211 |
| 6,352,368 B1 | 3/2002 | James |
| 6,358,002 B1 | 3/2002 | Good et al. |
| 6,368,672 B1 | 4/2002 | Thompson et al. |
| 6,386,763 B1 | 5/2002 | Mack et al. |
| 6,440,580 B1 | 8/2002 | Berger et al. |
| 6,451,454 B1 | 9/2002 | Hasz et al. |
| 6,472,075 B1 | 10/2002 | Niwa |
| 6,474,941 B2 | 11/2002 | Dingwell et al. |
| 6,481,960 B2 | 11/2002 | Bowen |
| 6,485,830 B1 | 11/2002 | Komorita et al. |
| 6,508,619 B1 | 1/2003 | Bosen |
| 6,511,945 B1 | 1/2003 | Ramstedt |
| 6,517,583 B1 | 2/2003 | Pope et al. |
| 6,582,190 B2 | 6/2003 | Jinnal |
| 6,605,160 B2 | 8/2003 | Hoskin |
| 6,613,462 B2 | 9/2003 | Macki et al. |
| 6,638,609 B2 | 10/2003 | Nordgren et al. |
| 6,655,845 B1 * | 12/2003 | Pope et al. .................. 384/492 |
| 6,660,133 B2 | 12/2003 | Penich et al. |

| | | | | | | |
|---|---|---|---|---|---|---|
| 6,660,405 | B2 | 12/2003 | Lau et al. | JP | 02-233575 | 9/1990 |
| 6,667,262 | B2 | 12/2003 | Agarwala et al. | JP | 04-308328 | 10/1992 |
| 6,675,478 | B2 * | 1/2004 | Sasaki et al. ........... 29/898.061 | JP | 04-341503 | 11/1992 |
| 6,696,392 | B2 | 2/2004 | Naik et al. | JP | 05-312168 | 11/1993 |
| 6,734,147 | B2 | 5/2004 | Levy | JP | 05-336693 | 12/1993 |
| 2001/0016091 | A1 | 8/2001 | Mesing et al. | JP | 07-057748 | 3/1995 |
| 2001/0022934 | A1 | 9/2001 | Mashey | JP | 07-247487 | 9/1995 |
| 2002/0058143 | A1 | 5/2002 | Hunt et al. | JP | 08-281332 | 10/1996 |
| 2002/0071760 | A1 | 6/2002 | Dingwell et al. | JP | 09-323191 | 12/1997 |
| 2002/0154991 | A1 | 10/2002 | Bowen | JP | 10-008182 | 1/1998 |
| 2002/0189722 | A1 | 12/2002 | Hasz et al. | JP | 10-130625 | 5/1998 |
| 2004/0037622 | A1 | 2/2004 | Ersoy et al. | JP | 11-131107 | 5/1999 |
| 2004/0161639 | A1 * | 8/2004 | Fukano et al. .............. 428/698 | JP | 11-242985 | 9/1999 |
| 2004/0217215 | A1 | 11/2004 | McLaughlin | JP | 2000102630 A * | 4/2000 |
| | | | | JP | 2001-044204 | 2/2001 |
| | | FOREIGN PATENT DOCUMENTS | | JP | 2001-276523 | 10/2001 |
| | | | | JP | 2002-270055 | 9/2002 |
| EP | 0 286 127 | A1 | 4/1988 | JP | 2003-042354 A | 2/2003 |
| EP | 0 520 520 | A1 | 4/1988 | WO | WO 97/12999 | 4/1997 |
| EP | 0 620 286 | A1 | 10/1994 | WO | WO 99/16565 | 4/1999 |
| EP | 1 336 764 | A1 | 8/2003 | WO | WO 01/00402 A1 | 1/2001 |
| GB | 2421057 | A * | 6/2006 | WO | WO 01/46324 A2 | 6/2001 |
| JP | 59-128992 | | 7/1984 | | | |
| JP | 60-255255 | | 12/1985 | * cited by examiner | | |

HIGH TEMPERATURE ROD END BEARINGS

BACKGROUND OF THE INVENTION

This invention relates generally to rod end bearing assemblies for use in high temperature, high altitude applications. In particular, the invention relates to rod end bearings for use in gas turbine engines.

In a gas turbine engine, air is drawn into the front of the engine, compressed by a shaft-mounted compressor, and mixed with fuel. The compressor is made up of several rows or stages of compressor stator vanes and corresponding rows or stages of compressor rotor blades therebetween. The stator vane rows are situated between the rotor blade rows and direct airflow toward downstream rotor blades on the rotor blade row. After leaving the compressor, the air/fuel mixture is combusted, and the resulting hot combustion gases are passed through the turbine section of the engine. The flow of hot combustion gases turn the turbine by contacting an airfoil portion of the turbine blade, which in turn rotates the shaft and provides power to the compressor. The hot exhaust gases exit from the rear of the engine, driving the engine forward. Optionally, a bypass fan driven by a shaft extending from the turbine section, which forces air around the center core of the engine and provides additional thrust to the engine.

Rod end bearings are bearing structures that connect together two rods, components or assemblies with a spherical or ball type joint. One type of rod known in the art, as described in U.S. Pat. No. 6,352,368, is a rod end bearing having an outer shell and having a spherical inner surface. Inside the outer shell there is a ball part. Between the ball part and the outer shell there is a bearing race. The outer shell and ball are fabricated from steel and the bearing is fabricated from polyurethane. Alternatively, rod end bearings having a molded race situated between the outer shell part and the inner ball part fabricated from injection molded reinforced nylon.

A number of structures in the gas turbine engine utilize rod end bearings. The rod end bearings include rod end bearings connecting the actuator mechanism to the variable stator vane. Additional structures in the gas turbine engine are subject to wear, including variable geometry exhaust actuating mechanisms. Each of the rod end bearing applications is subjected to conditions of wear at temperatures ranging from low temperatures to highly elevated temperatures. In addition, the rod end bearings are subject to high altitude atmospheres. In addition to low temperatures, high altitude atmosphere includes little or no water vapor. Water vapor is required for conventional graphite containing lubricants to maintain lubricity.

Wear occurs when contacting surfaces of two components rub against each other. Typical results from wear include scoring of one or both surfaces, and/or material removal from one or both surfaces. In rod end bearings used in the gas turbine engine, scoring may occur on one or both of the surface of the ball and the surface of the bearing casing, both of which are expensive to repair and/or replace. As the surfaces are damaged, they become even more susceptible to the effects of wear as their effective coefficients of friction rise and wear increases the clearance between the wearing surfaces, so that loads are more concentrated and causes undue motions, so the wear damage accelerates with increasing time in service. Wear debris, which may include material removed from the wearing surfaces due to wear, or may include foreign particles, such as dust or debris from the air traveling through the engine can further accelerate wear. In addition to the damage to the ball and the bearing casing, the coefficient of friction between the ball and the bearing casing increase, thereby increasing the amount of force required to move the rod and bearing. Therefore, as the rod end bearing wears, increased force is needed from an attached actuator to move the bearing during operation. The increased force requirement causes additional strain on the actuator and/or results in the need for a larger actuator.

To increase the operating capacity of the compressor, at least some of the compressor stator vane rows are designed with vanes that can rotate around an axis that is in its longitudinal direction to adjust the angular orientation of the vane with respect to the airflow traveling through the compressor. The adjustment of the angular orientation allows control of the amount of air flowing through the compressor. Variable stator vane designs typically allow for about 45° rotation of the stator vane to optimize compressor performance over the operating envelope of a gas turbine engine. The variable stator vane structures include an outer trunnion disposed in a complementary mounting boss in the stator casing for allowing rotation of the vane relative to the casing. A lever arm is fixedly joined to a coaxial stem extending outwardly from the vane trunnion. The distal end of the lever arm is operatively joined to an actuation ring that controls the angle of the vane. All of the vane lever arms in a single row are joined to a common actuation ring for ensuring that all of the variable vanes are positioned relative to the airflow in the compressor stage at the same angular orientation.

When a rod end bearing fails due to excessive wear, malfunctions in the gas turbine engine compressor may occur. The failure of the rod end bearing may create an increase in force required by the actuator to move the bearing and/or the attached system. In addition, the failure may result in a loss of control of the system connected to the bearing.

One known material for fabrication of wear surfaces for variable stator vane assemblies is a specially developed composite of carbon fiber reinforcing rods in a polyimide resin matrix manufactured by E. I. Du Pont De Nemours and Company of Wilmington, Del. The material is commonly known as VESPEL® CP™. VESPEL® and CP™ are trademarks that are owned by E. I. DuPont DeNemours and Company. The polyimide resin used in VESPEL® CP™ is commonly known as NR150™. The NR150™ trademark is owned by Cytec Technology Group of Wilmington, Del. Although the VESPEL® CP™ material has an extended life at temperatures 450-500° F. (232-260° C.), the VESPEL® CP™ bushing have an upper temperature limit of 600° F. (316° C.). Extended operation at temperatures at or above 600° F. (316° C.) limit their operational life. The material does not withstand the combinations of high temperature and vibrational loading experienced in the operation of the gas turbine engine well, leading to a relatively short part life.

Another known method for reducing wear on the variable stator vane assembly is placing a carbon-containing antifriction coating on sliding surfaces within the variable stator vane assembly. This antifriction coating is a coating fabricated from a material that reduces the coefficient of friction between the ball bearing and the bearing casing. One carbon-containing component known for antifriction coating is graphite. However, graphite has the disadvantage that water vapor is required to maintain lubricity. Atmospheres at aircraft cruise altitudes do not have enough water vapor present for graphite to be lubricious. Graphite also has the disadvantage in that graphite has poor tribological properties in applications that require reciprocating motion. An additional disadvantage of graphite is that graphite begins to oxidize rapidly at temperatures at or greater than 500° C. (932° F.). Some variable stator vane systems may experience temperatures in excess of 500° C. (932° F.). Therefore, a replacement material for graphite in antifriction coating is needed.

There is accordingly a need for an improved approach to the protection of gas turbine components, such as variable vane trunnion surfaces, variable vane casing surface or other surfaces in the gas turbine engine against the damage caused by wear. The present invention fulfills this need, and further provides related advantages.

SUMMARY OF THE INVENTION

The present invention is a rod end bearing comprising a body having a ring portion and a rod portion. The ring portion comprises a ring having an opening, the opening having a center axis. The rod portion comprises a first rod extending radially from the ring in a direction perpendicular to the center axis. The opening has a geometry sufficient to support a substantially spherical ball bearing, and permit rotation of the ball bearing inside the ring. The inner periphery of the ring is in contact with the ball bearing and includes a wear coating. An antifriction coating is disposed on a surface selected from the group consisting of a surface of the wear coating, a surface of the ball bearing and combinations thereof. The antifriction coating maintains a coefficient of friction between the wear coating and the ball bearing of up to about 0.95 in atmospheres substantially devoid of water vapor.

The rod end bearing structure according to the present invention has increased performance at higher temperatures, such as the temperatures experienced during gas turbine engine operation. Temperatures experienced during gas turbine engine operation that provide increased performance include temperatures from about room temperature up to about 1200° F. (649° C.). A preferred temperature that provides increase performance includes temperatures from about 400° F. (204° C.) up to about 1200° F. (649° C.). As the temperature of the apparatus rises, the material making up the rings and supporting the ball bearing and the fasteners holding the rings together expand at a rate faster than the material of the ball bearing. The difference in expansion rates result in less force on the sliding surfaces between the rings and the ball bearing and thereby reduces the friction force or load between the rings and the ball bearing.

Another advantage of the rod end bearing structure according to the present invention is subject to reduced wear while having an improved resistance to vibration and improved resistance to elevated temperatures, where the gas turbine engine parts attached to the rod end bearing may be utilized at temperatures greater than about 1000° F. (538° C.), including operational temperatures of greater than about 1200° F. (649° C.).

Another advantage of the rod end bearing structure, according to the present invention, is that the wear coating and antifriction coating combination reduces wear and maintains desirable tribological properties, such as high lubricity, in high altitude atmospheres having little or no water vapor. In particular, the rod end bearing structure maintains desirable tribological properties under conditions experienced by an aircraft gas turbine engine during normal operation.

Another advantage of the rod end bearing structure, according to the present invention, is that the rod end bearing structure provides an efficiency improvement in the gas turbine engine by reducing the friction force or load requirements for the actuator mechanism, thereby reducing the weight of the engine. In addition, the rod end bearing structure is easily serviced and/or replaced, thereby reducing the overhaul costs for the engine.

Another advantage of the rod end bearing according to the present invention, is that the materials used in the rod end bearing of the present invention, including the antifriction coating, can readily withstand the higher temperatures of operation utilized in current advanced engine designs. The materials used in the antifriction coating of the present invention can be utilized at temperatures greater than about 1000° F. (538° C.), including operational temperatures of greater than about 1200° F. (649° C.), without deterioration due to the combined effects of temperature, vibration, and high altitude atmosphere.

Another advantage of the end rod bearing according to the present invention is that the antifriction coating is resilient and regenerates in areas where the antifriction coating is rubbed thin or worn off the wear surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
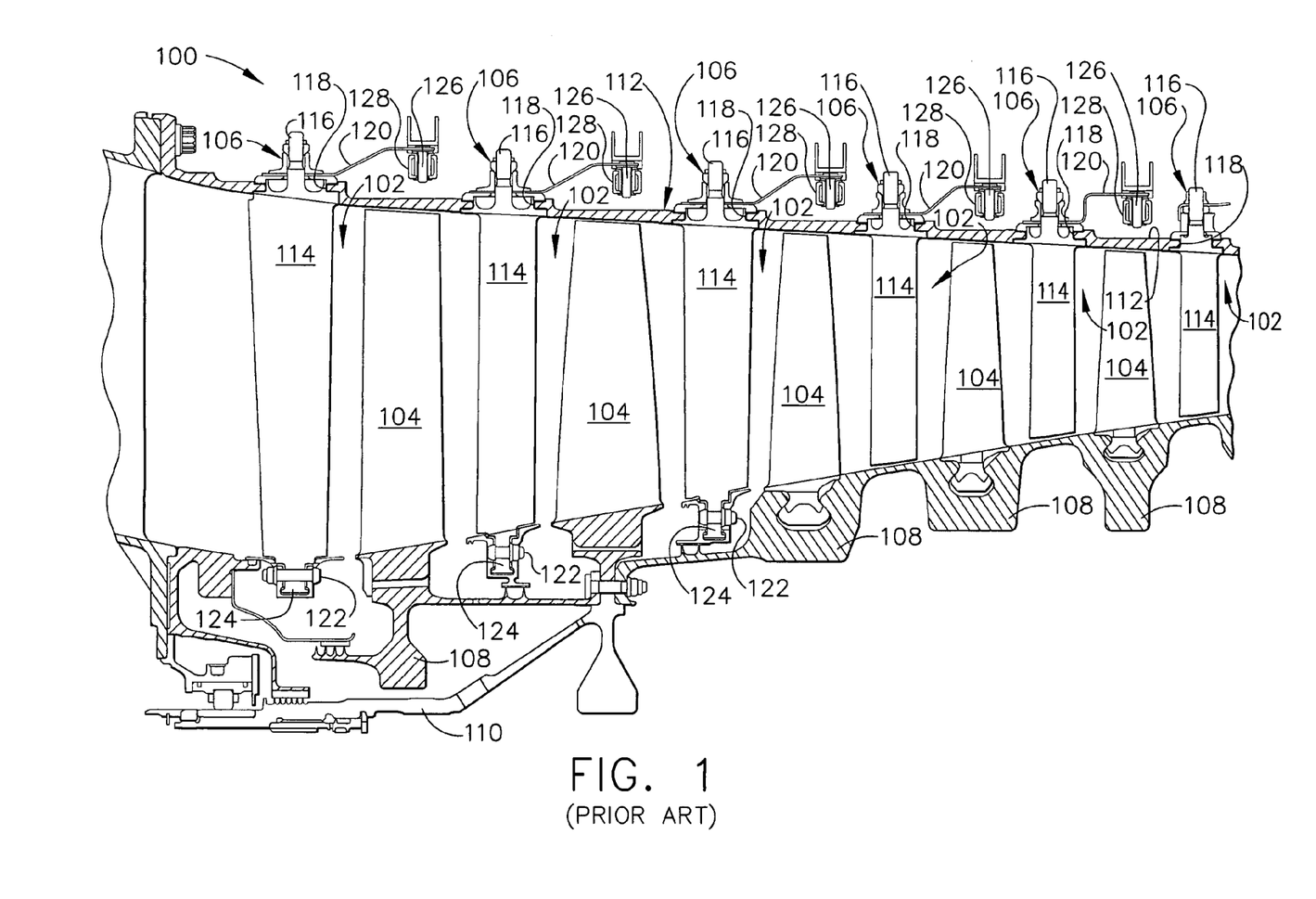
FIG. 1 is a schematic view of a portion of a prior art high-pressure compressor for a turbine engine.

FIG. 1 is a schematic view of a section of a known high-pressure compressor 100 for a turbine engine (not shown). Compressor 100 includes a plurality of stages 102, and each stage 102 includes a row of rotor blades 104 and a row of variable stator vane assemblies 106. Rotor blades 104 are typically supported by rotor disks 108, and are connected to a rotor shaft 110. Rotor shaft 110 is a high-pressure shaft that is also connected to a high-pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from vane stem 116 that are utilized to rotate variable vanes 114. The orientation of variable vanes 114 relative to the flow path through compressor 100 control airflow therethrough. Some variable vane assemblies 106 are secured to shroud 124 by bolts 122.

At the distal end of the lever arm 120 extending away from the variable vane 114, the lever arm 120 includes an actuator pin 126 extending through the lever arm 120. The actuator pin 126 connects the lever arm 120 to an actuator ring 128. The actuator ring 128 connects the variable stator vanes 114 radially about the engine in each stage so that the vanes 114 in each stage can be adjusted in unison. As the actuator ring 128 and the actuator pin 126 rotate, sliding friction occurs between the lever arm 120, the actuator pin 126 and the actuator ring 128.

Figure 2:
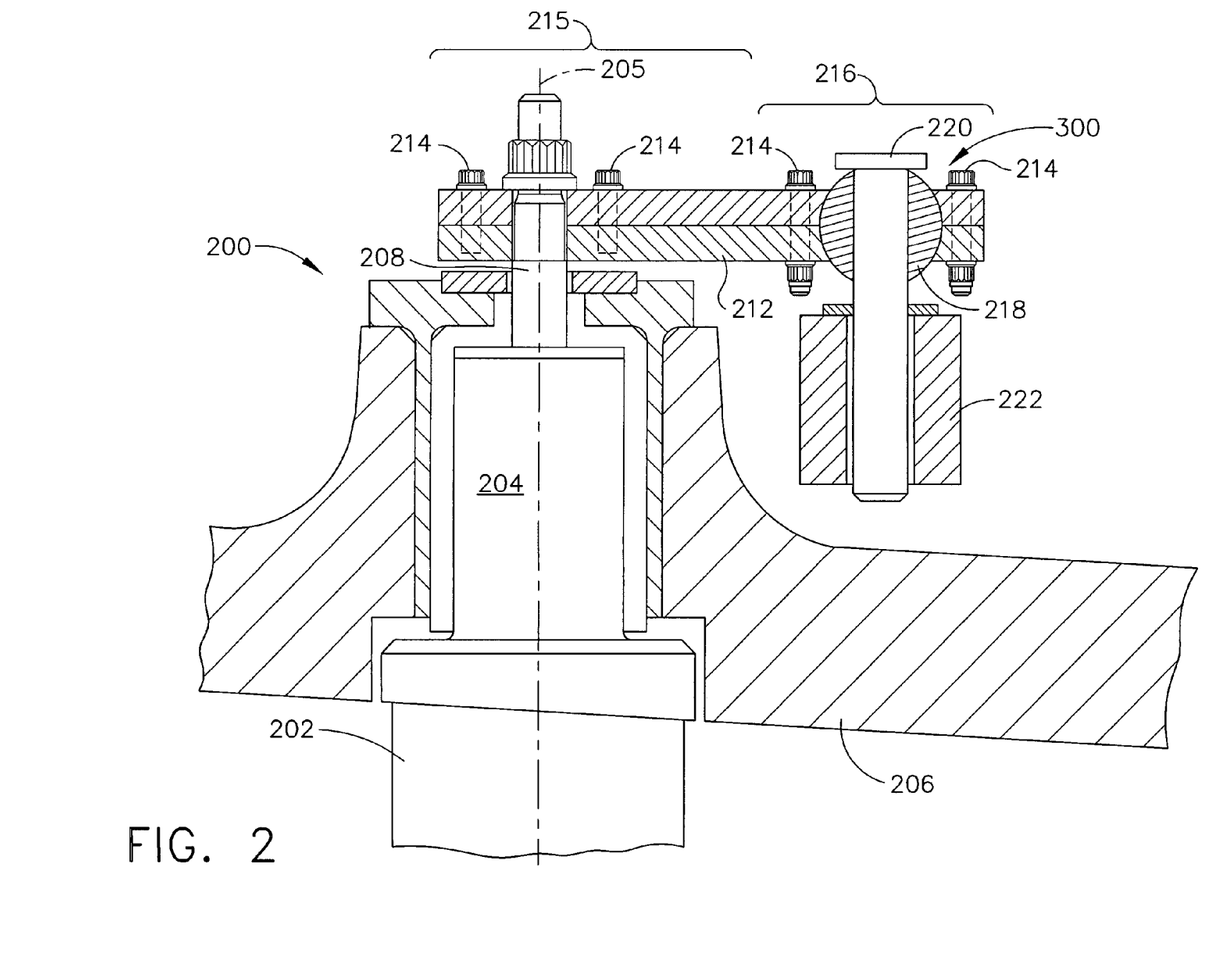
FIG. 2 is a cross-sectional view of a variable vane assembly used in an aircraft engine high-pressure compressor having a rod end bearing according to the present invention.

FIG. 2 is a cross-sectional view of a variable stator vane assembly 200 of a gas turbine engine, including a rod end bearing 300 assembly according to the invention. Variable vane assembly 200 includes a variable vane 202. Vane trunnion 204 is attached to variable vane 202 and is permitted to rotate around a center axis 205. Vane trunnion 204 includes attachment pin 208. Attachment pin 208 connects vane trunnion 204 to a first lever arm 210 and a second lever arm 212. The first and second lever arms 210 and 212 rotate around the center axis 205 of vane trunnion 204. The rotation of vane trunnion 204 permits variability of the aspect angle of variable vane 202. The variability of variable vane 202 permits increased compressor performance.

The first and second lever arms 210 and 212 are fastened together by lever arm fasteners 214. The first and second lever arms 210 and 212 include a ring portion 216, which provides a ring shaped opening for receiving ball bearing 218. The first and second lever arms 210 and 212 may be fabricated from any suitable material, including but not limited to metals and alloys. The first and second lever arms 210 and 212 are preferably fabricated from a metal or alloy having a greater thermal coefficient of expansion than the ball bearing 218. Suitable materials for fabricating the first and second lever arms include, but are not limited to, nickel-based superalloys, titanium alloys, cobalt-based superalloys, iron-based superalloys, stainless steel and combinations thereof.

The first and second lever arms 210 and 212 are fastened together to support the ball bearing 218 within ring portion 216. Lever arm fasteners 214 may be any fastener suitable for fastening together the first and second lever arms 210 and 212. The lever arm fasteners 214 preferably provide an adjustable distance between the first and second lever arms 210 and 212. Suitable fasteners for use as the lever arm fasteners 214 may include adjustable bolts, detachable rivets or set gaps. The fasteners are also preferably fabricated from a material having a greater thermal coefficient of expansion than the ball bearing 218. Ball bearing 218 is permitted to rotate within the ring portion 216 of the first and second lever arms 210 and 212. Ball bearing 218 is preferably fabricated from a material selected from the group consisting of silicon nitride (e.g., $Si_3N_4$), tungsten carbide (e.g., WC), titanium carbide (e.g., TiC), cobalt-chromium-molybdenum alloys, zirconium oxide (e.g., $ZrO_2$) and combinations thereof. A preferred material for the ball bearing 218 is silicon nitride. An actuator pin 220 is placed through ball bearing 218 and extends to actuator ring 222. The actuator pin 220 is a rod fabricated from any suitable material, including but not limited to, metals and alloys. Actuator ring 222 connects to an actuator (not shown. Actuator ring 222 provides force to the actuator pin 220, which is then transferred to the first and second lever arm 210 and 212. The first and second lever arms 210 and 212 rotate around the center axis 205 of vane trunnion 204 adjusting the angle of the variable stator vane 202 perpendicular to the center axis 205. While FIG. 2 illustrates a variable stator vane system 200 using the rod end bearing 300 according to the present invention, the rod end bearing 300 is not limited to variable stator vane systems 200. The rod end bearing 300 according to the present invention may be used in any application requiring the connection of two rods through a ball joint that may be exposed to temperatures up to about 1200° F. (649° C.) and/or high altitude atmospheres.

Figure 3:
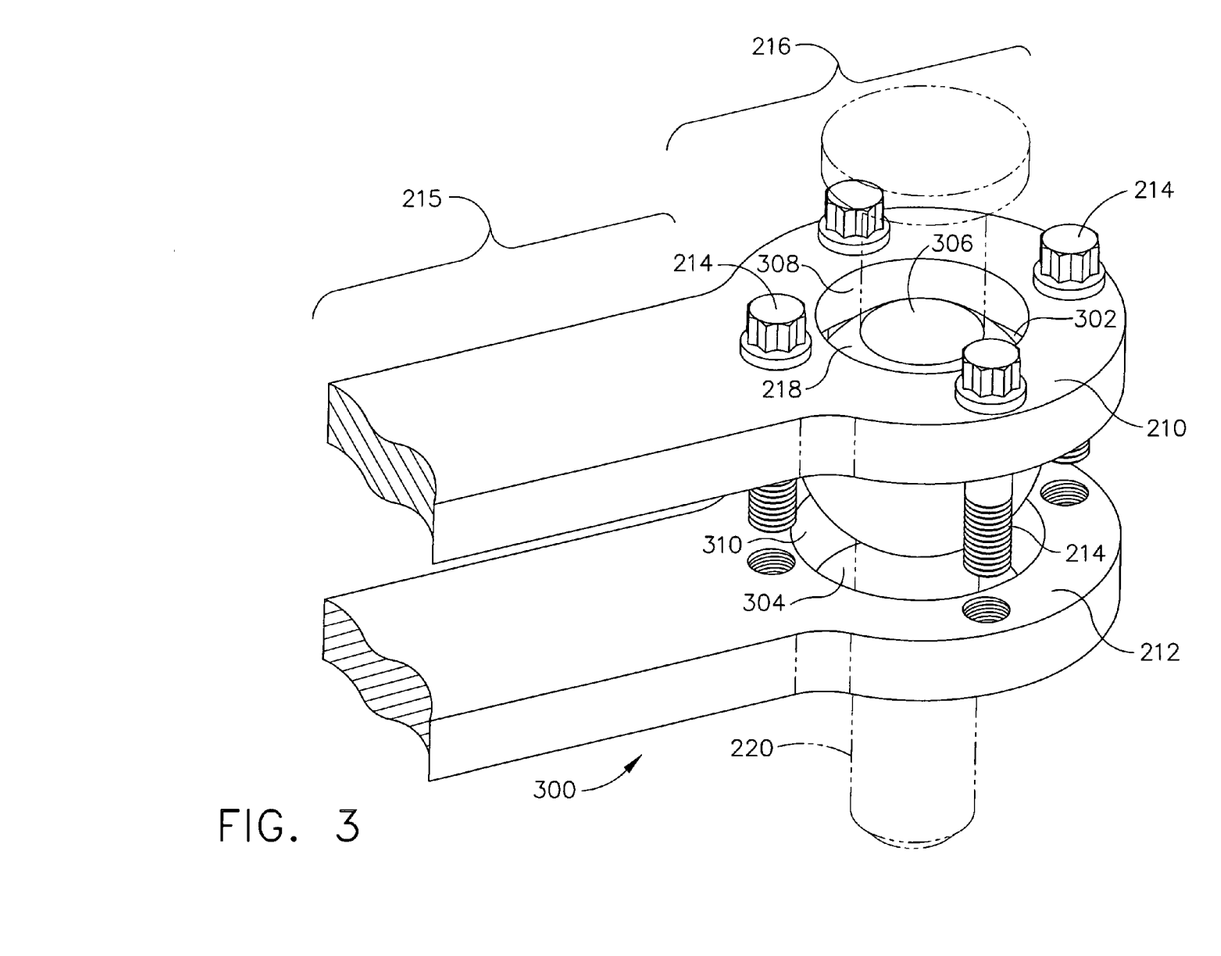
FIG. 3 is a perspective view of a rod end bearing according to the present invention.

FIG. 3 shows a perspective view of a rod end bearing 300 according an embodiment of the present invention. The first and second lever arms 210 and 212 are shown attached by lever arm fasteners 214. The first and second lever arms 210 and 212 are each made up of a rod portion 215 and a ring portion 216. Ring portion 216 of the first and second lever arms 210 and 212 include a first lever arm opening 302 and a second lever arm opening 304. The first and second lever arm openings 302 and 304 are sufficient in size to permit rotation of and support ball bearing 218. Ball bearing 218 includes an opening 306 for receiving an actuator pin 220. Ball bearing 218 is supported by and in contact with the first and second lever arms 210 and 212 at the first and second inner ring surfaces 308 and 310. The first inner ring surface 308 defines the inner surface of the ring defined by the ring portion 216 of the first lever arm 210. The second inner ring surface 310 defines the inner surface of the ring defined by the ring portion 216 of the second lever arm 212. The first and second inner surfaces 308 and 310 contact the ball bearing 218 and are subject to sliding friction.

Figure 4:
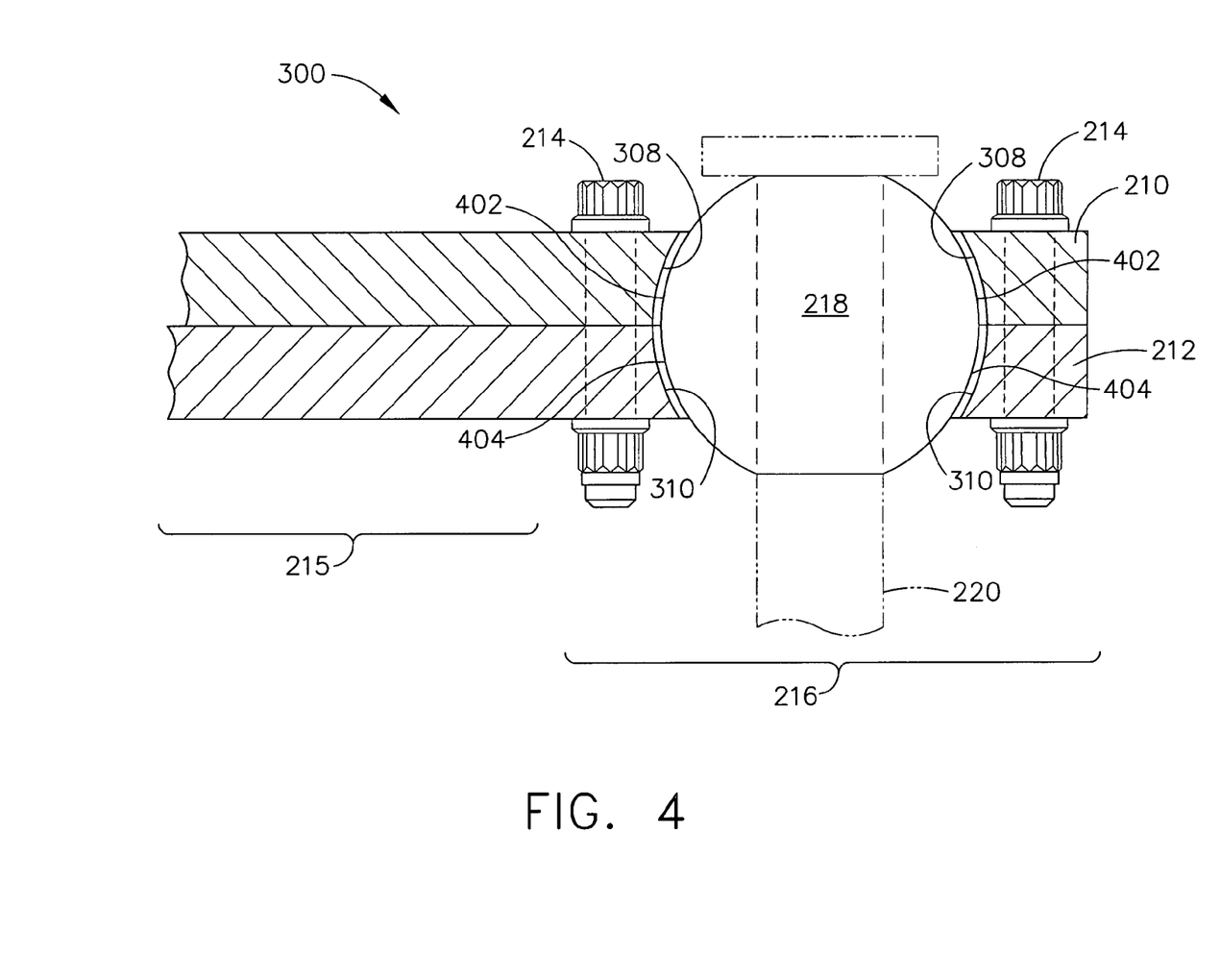
FIG. 4 is a cross-sectional view of a rod end bearing according to the present invention.

FIG. 4 is a cross-sectional view of a rod end bearing 300 according to the present invention. The first and second lever arms 210 and 212 are shown attached by lever arm fasteners 214. Actuator pin 220 (shown in shadow) extends through ball bearing 218 and connects to an actuator ring 222 (not shown). Ball bearing 218 is supported by and in contact with the first and second lever arms 210 and 212 at the first and second inner ring surfaces 308 and 310. The first inner ring surface 308 defines the inner surface of the ring defined by the ring portion 216 of the first lever arm 210. The second inner ring surface 310 defines the inner surface of the ring defined by the ring portion 216 of the second lever arm 212. The geometry of the first and second inner surfaces 308 and 310 is approximately the same geometry as the first and second ball bearing surfaces 402 and 404 contacting the first and second inner surfaces 308 and 310.

Figure 5:
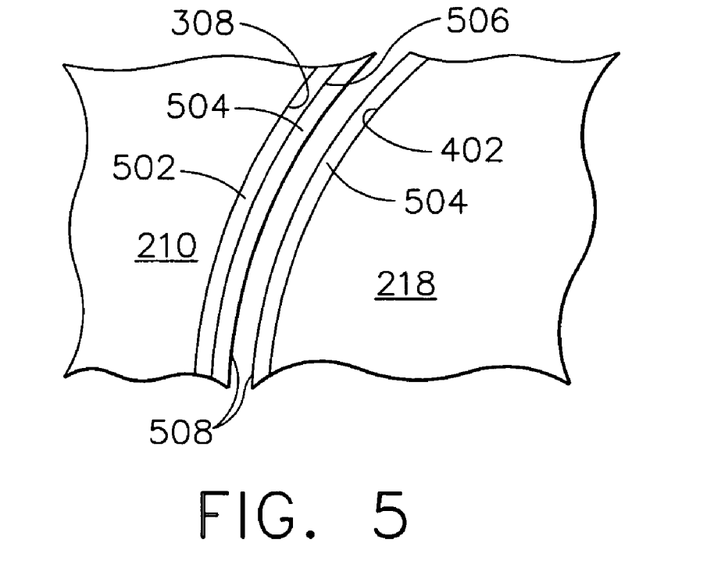
FIGS. 5-7 are schematic views of coating arrangements according to the present invention.
Figure 6:
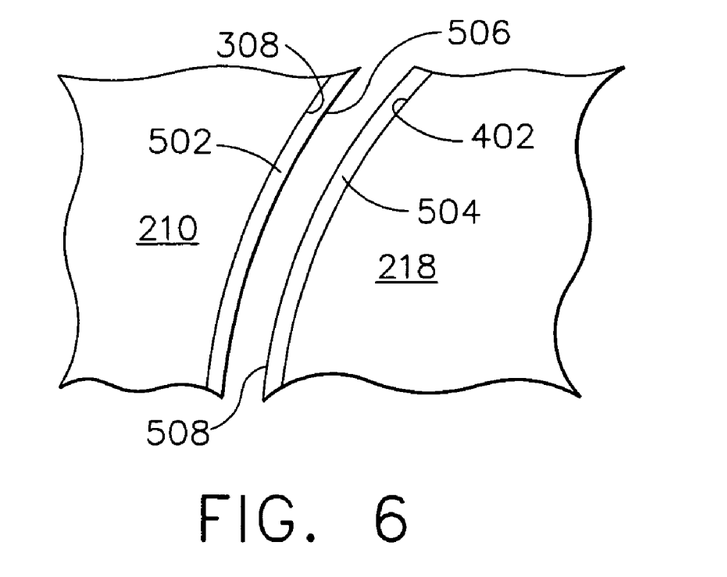
Figure 7:
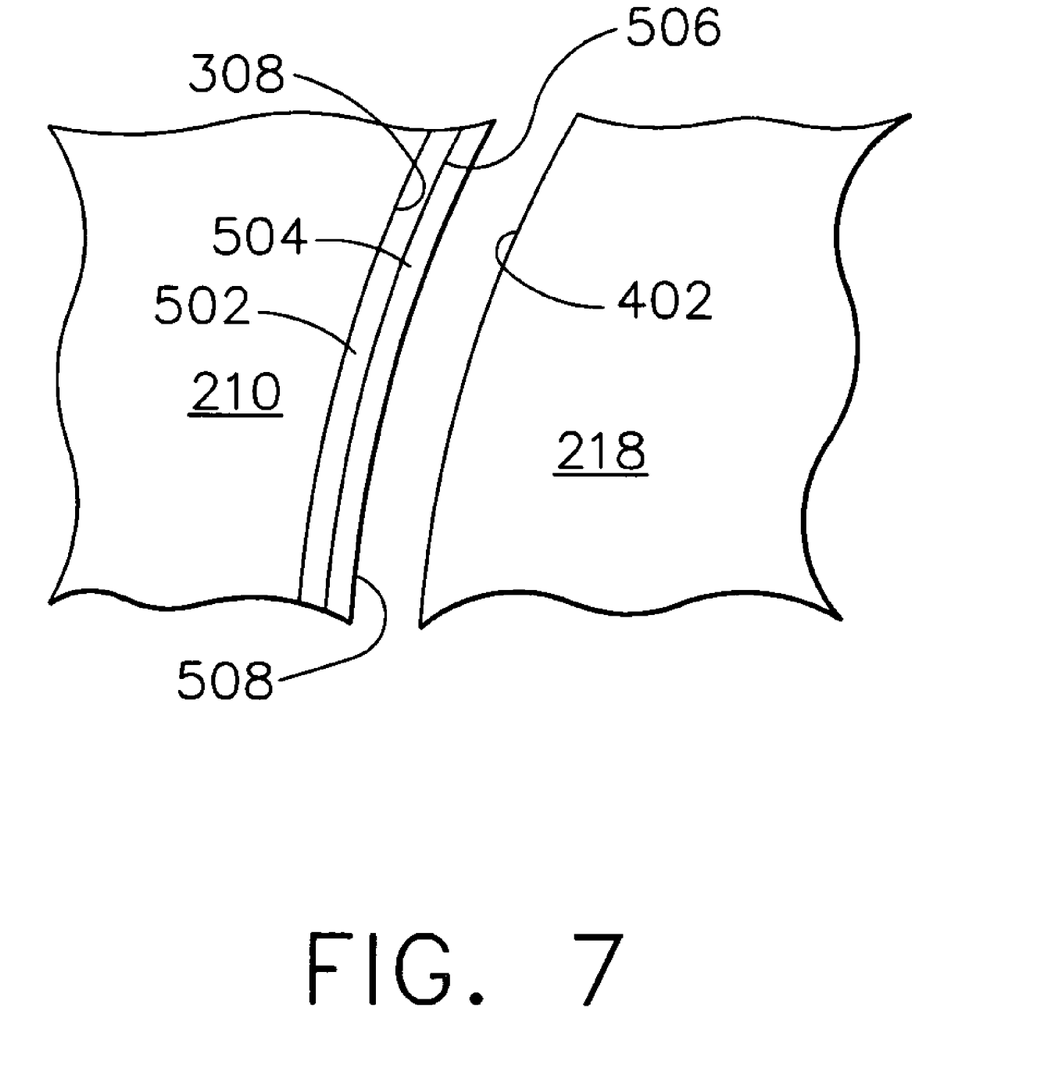

FIGS. 5-7 shows enlarged cross-sections taken from a region that extends circumferentially around the first inner ring surface 308 at the point where the first inner surface ring 308 contacts the first ball bearing surface 402. The first and second inner surfaces 308 and 310 contact the first and second surfaces 402 and 404 of the ball bearing 218 and are subject to sliding friction, as shown in FIG. 4. FIGS. 5-7 illustrate different embodiments of the present invention. The cross sections in FIGS. 5-7 each include first lever arm 210, first inner ring surface 308, ball bearing 218, first ball bearing surface 402, wear coating 502 and antifriction coating 504. In each of FIGS. 5-7, wear coating 502 is disposed on the first inner ring surface 308. Wear coatings 502 may include, but are not limited to, tungsten carbide or titanium nitride. FIGS. 5-7 illustrate alternate locations for placement of antifriction coating 504. Antifriction coating 504 may be disposed on wear coating 502, on first ball bearing surface 402, or on a combination thereof. Antifriction coating 504 may include, but is not limited to tungsten sulfide, bismuth telluride, bismuth oxide or combinations thereof in a binder of aluminum phosphate, titanium oxide or combinations thereof.

FIG. 5 shows a coating arrangement according to an embodiment of the present invention. FIG. 5 includes first lever arm 210, first inner ring surface 308, ball bearing 218, first ball bearing surface 402, wear coating 502 and antifriction coating 504. Ball bearing 218 rotates inside first lever arm 210 during operation of the rod end bearing 300. The ball bearing 218 and the first lever arm 210 are in contact and may experience rubbing due to relative motion of ball bearing 218 against the first lever arm 210. Surface 308 of the first lever arm 210 includes wear coating 502 to help reduce wear of the first lever arm 210. Wear coating 502 may include, but is not limited to, tungsten carbide or titanium nitride. The first lever arm 210 also includes antifriction coating 504 disposed on wear coating surface 506. In the embodiment shown in FIG. 5, an additional antifriction coating 504 is disposed on surface 402 of ball bearing 218. Antifriction coating surfaces 504 are in frictional contact and rub against each other. The embodiment shown in FIG. 5 has the benefit that it permits antifriction coating 504 on ball bearing 218 to rub against antifriction coating 504 on wear coating surface 506. Antifriction coating surface 504 may contact each other and rub against each other in frictional contact. The embodiment shown in FIG. 5 has the benefit that antifriction coating 504 is coated onto wear coating 502 providing desirable tribological properties. In particular, the combination of the hard, wear resistant wear coating 502 and the soft, lubricious antifriction coating 504 provide sliding surfaces that simultaneously have a low coefficient of friction and increased wear resistance. The additional antifriction coating 504 on opposing surfaces 508 provides additional coating protection and lubricious properties for each of the ball bearing surface 402 and the wear coating surface 506. Additionally, having antifriction surfaces 508 oppose each other allows additional material to migrate back and forth along surfaces 402 and 506 increasing uniformity and regeneration of the antifriction coating 504 along the ball bearing surface 402 and the wear coating surface 506. Uniformity and regeneration result from migration of the material making up antifriction coating 504 from location to location along the surfaces, providing uniform distribution of antifriction coating 504 and regeneration of antifriction coating 504 in areas having less antifriction coating material. In addition, the antifriction coating 504 may migrate between wear coating surface 506 and ball bearing surface 402.

FIG. 6 shows a coating arrangement according to an alternate embodiment of the present invention. FIG. 6 shows first lever arm 210, first inner ring surface 308, ball bearing 218, first ball bearing surface 402, wear coating 502 and antifriction coating 504, substantially as described above with respect to FIG. 5. As in the embodiment illustrated in FIG. 5, wear coating 502 is disposed on surface 308 of first lever arm 210. First lever arm 210 and ball bearing 218 are in contact and may experience rubbing due to relative motion of ball bearing 218 against first lever arm 210. In the embodiment illustrated by FIG. 6, the surface 402 of ball bearing 218 is coated with an antifriction coating 504. Unlike the embodiment shown in FIG. 5, no antifriction coating 504 is present on the wear coating 502. The antifriction coating surface 508 and surface 506 of the wear coating 502 may contact each other and rub against each other in frictional contact. The embodiment shown in FIG. 6 has the benefit that antifriction coating 504 is coated onto ball bearing 218, which is easily removed from the rod end bearing 300 and coated. Ball bearing 218 is removable from the rod end bearing 300 by detaching the first lever arm 210 from the second lever arm 212. The removable ball bearing 218 makes coating the surface of the ball simple. Therefore, the application of antifriction coating 504 requires less equipment and labor than applying antifriction coating 504 to surface 506 of wear coating 502. Additionally, material making up antifriction coating 504 migrates from location to location along surface 402 of ball bearing 218, providing uniform distribution of antifriction coating 504 and regeneration of antifriction coating 504 in areas having less antifriction coating material. In addition, the antifriction coating 504 may migrate between wear coating surface 506 and ball bearing surface 402. In service, ball bearing 218 can be readily replaced with a replacement ball bearing 218 carrying a fresh supply of antifriction coating 504.

FIG. 7 shows a coating arrangement according to an alternate embodiment of the present invention. FIG. 7 shows first lever arm 210, first inner ring surface 308, ball bearing 218, first ball bearing surface 402, wear coating 502 and antifriction coating 504, substantially as described above with respect to FIG. 5. As in the embodiment illustrated in FIG. 5, wear coating 502 is disposed on surface 308 of first lever arm 210. The first inner ring surface 308 and ball bearing 218 are in contact and may experience rubbing due to relative motion of ball bearing 218 against first lever arm 210. In the embodiment illustrated by FIG. 7, surface 506 of wear coating 502 is coated with antifriction coating 504. Unlike FIGS. 5-6, no antifriction coating 504 is present on ball bearing 218. In this embodiment, surface 508 of antifriction coating 504 and surface 404 of ball bearing 218 may contact each other and rub against each other in frictional contact. The embodiment shown in FIG. 7 has the benefit that antifriction coating 504 is coated onto wear coating 502 providing desirable tribological properties. In particular, the combination of the hard, wear resistant wear coating 502 and the soft, lubricious antifriction coating 504 provide sliding surfaces that simultaneously have a low coefficient of friction and increased wear resistance. Additionally, material making up antifriction coating 504 migrates from location to location along the surface 506 of wear coating 502, providing uniform distribution of antifriction coating 504 and regeneration of antifriction coating 504 in areas having less antifriction coating material. Applying antifriction coatings 504 to the entire first and second lever arm 210 and 212 is a simple procedure, which allows for easy inspection. Inspection of the coating in those areas is also simple due to easy accessibility.

While the coatings provided in FIGS. 5-7 are illustrated for the first lever arm 210, the second lever arm 212 is likewise provided with the wear coating 502 and antifriction coating 504. The structure of the end rod bearing is not limited to the structure shown in FIGS. 3-7. Any bearing structure utilizing sliding surfaces that may come in contact with high temperatures and/or high altitude atmospheres may use the wear coating 502, antifriction coating 504 combination of the present invention. Alternative structures include, but are not limited to, sliding bearings, roller bearings, ball joints, hinges, gears and seals. The present invention utilizes the combination of the relatively hard wear coating 502 in combination with a separate, relatively soft, lubricious antifriction coating 504, which may be placed on wear surfaces, including wear coatings 502 and component surfaces, within the rod end bearing 300 structure.

One embodiment of the present invention includes rod end bearing structure for use in a variable stator vane for a gas turbine engine. The rod end bearings structure includes a first and second lever arms 210 and 212, a ball bearing 218, a wear coating 502 on the first lever arm 210 and an antifriction coating 504 on either or both of the ball bearing 218 and the wear coating 502. The antifriction coating 504 maintains a low coefficient of friction in high altitude atmospheres. The coefficient of friction maintained between the ball bearing 218 and the first and second lever arm 210 and 212 under normal gas turbine engine operating conditions (e.g., high temperature, high vibration, and high altitude atmosphere exposure) is equal to or less than 0.6 and preferably equal or less than 0.4. The coefficient of friction is measured between the two surfaces rubbing against each other within the rod end structure. The embodiment of the present invention shown in FIG. 5, the coefficient of friction between antifriction coating 504 on ball bearing 218 and antifriction coating 504 on wear coating 502, is less than or equal to about 0.6. The embodiment of the present invention shown in FIG. 6, the coefficient of friction between antifriction coating 504 and wear coating 502 is less than or equal to about 0.6. The embodiment of the present invention shown in FIG. 7, the coefficient of friction between antifriction coating 504 and ball bearing 218 is less than or equal to about 0.6.

The first and second lever arm 210 and 212 structure, including the ring portion 216 supporting the ball bearing 218, may be fabricated from any suitable material, including but not limited to metals and alloys. Preferred materials include nickel-based superalloys, titanium alloys, cobalt-based superalloys, iron-based superalloys, stainless steel and combinations thereof. The ball bearing 218 may include a material selected from the group consisting of silicon nitride (e.g., $Si_3N_4$), tungsten carbide (e.g., WC) titanium carbide (e.g., TiC), cobalt-chromium-molybdenum alloys, zirconium oxide (e.g., $ZrO_2$) and combinations thereof. These ball bearings 218 are made from strong, relatively inflexible material.

Wear coatings 502 are provided on metal or alloy surfaces to provide a surface 506 having desirable wear properties, such as high hardness and wear resistance. Materials used for the first and second lever arms 210 and 212 include materials that are suitable for receiving the wear coating 502. Suitable material for receiving wear coatings may include, but are not limited to, nickel-based superalloys, titanium and its alloys, cobalt-based superalloys, iron-based superalloys and stainless steel. Wear coatings 502 provide a surface 506 that has the properties of being both hard and smooth and capable of receiving an antifriction coating 504. In one embodiment of the present invention, the first and second lever arms 210 and 212 are coated with a cemented tungsten carbide. Cemented tungsten carbides include those tungsten carbides that include a sufficient amount of cobalt to impart wear resistance. Sufficient amounts of cobalt are typically about 6-20% by weight and preferably about 12% by weight. The wear coating 502 may be applied by a plasma spray technique or other suitable method known in the art. A suitable plasma spray technique is high velocity oxy-fuel (HVOF) spraying, although other plasma spray techniques such as low-pressure plasma spray (LPPS) or air plasma spraying (APS) can be used to successfully apply the coating. Alternatively, the first and second lever arms 210 and 212 may be coated with a plasma vapor deposited (PVD) wear coatings 502 of titanium nitride or tungsten carbide. The preferred coating is a relatively thin wear coating 502 of titanium nitride or tungsten carbide applied by PVD. These wear coatings 502 may be applied to a thickness as low as about 0.0002 inches and as high as about 0.010. Preferably, the coating thicknesses are in the range from about 0.001 to about 0.005 inches, including coating thickness of about 0.003 inches. The resultant wear coating 502 is a hard, smooth surface resistant to wear.

The present invention also utilizes an antifriction coating 504 placed between the wear coated lever arms 210 and 212 and the ball bearing 218. The antifriction coating 504 is preferably coated on surface 506 of the wear coating 502. However, the antifriction coating 504 may also be coated on the surface of the ball bearing 218.

The antifriction coating 504 comprises a binder, a friction modifying agent, and, optionally, an additive. The binder of the antifriction coating 504 comprises a material selected from the group consisting of sodium silicate, aluminum phosphate, titanium oxide and combinations thereof. The friction-modifying agent is preferably dispersed substantially uniformly through the binder. The antifriction coating 504 reduces the coefficient of friction between ball bearing 218 and wear coatings 502. Of the antifriction coating binders, aluminum phosphate, titanium oxide and combinations thereof are preferred. In one embodiment, as the variable stator vane bushing assembly 200 operates, the antifriction coating 504 may eventually be consumed. The antifriction coating 504 is resilient and regenerates in areas where the antifriction coating 504 is rubbed thin or worn off the wear coating 502. The antifriction coating 504 is considered to be thin when the thickness on a portion of the surface is insufficient to provide sufficient lubricity to the sliding surfaces to maintain the coefficient of friction at the desired level. During operation, the antifriction coating 504 may migrate from location to location along the wear surface. The migration of the antifriction coating 504 allows areas that have less material or are rubbed completely off to receive antifriction coating 504 material from other locations along the wear surface to regenerate the antifriction coating 504 missing from the area rubbed thin or completely off. In addition, the antifriction coating 504 may migrate between wear coating surface 506 and ball bearing surface 402. Migration of antifriction coating 504 between surfaces can take place due to the rubbing or burnishing of the opposing surfaces.

The binder material for use in the antifriction coating 504 is any binder material that is tribologically compatible with all of the following materials: water, detergents used in the cleaning of gas turbine engine parts, deicers known in the art used to deice aircraft in winter, aircraft fuel, oil and hydraulic fluid. The binder materials are tribologically compatible if the binder material in the antifriction coating 504 maintains tribological properties (e.g., lubricity and wear resistance) of the antifriction coating 504 when in contact with the surfaces subjected to sliding friction and in contact with the materials listed above. Suitable binder materials include, but are not limited to, sodium silicate, aluminum phosphate, titanium oxide and combinations thereof.

In addition to the binder, a friction modifier is also present in the antifriction coating 504. The friction modifier is any material that, when added to the binder, produces a friction coefficient suitable for rotating a stator vane in a variable stator vane assembly, capable of maintaining desirable tribological properties at high altitude atmospheres and and/or high temperatures. The high altitude atmospheres include atmospheres to which aircraft are exposed during flight. The high altitude atmosphere includes atmospheres having reduced water vapor. High temperature exposure is a result of the operation of the gas turbine engine. The compression of the gas and the combustion of the fuel result in high temperatures in gas turbine engines. Parts within the gas turbine engine are subject to high temperatures. The coating system of the present invention may find uses in parts within the gas turbine engine that are exposed to temperatures up to about 1200° F. (649° C.). Desirable tribological properties include, but are not limited to low coefficient of friction between sliding surfaces (i.e., high lubricity) and low wear between sliding surfaces. Suitable friction modifier materials include, but are not limited to, tungsten sulfide (e.g., $WS_2$), bismuth telluride (e.g., $Bi_2Te_3$), copper sulfide (e.g., $Cu_2S$), bismuth oxide (e.g., $Bi_2O_3$) and combinations thereof. Of the friction modifiers, tungsten sulfide (e.g., $WS_2$), bismuth telluride (e.g., $Bi_2Te_3$) and bismuth oxide (e.g., $Bi_2O_3$) are preferred.

Table 1 shows examples of antifriction coating materials according to the present invention. The examples shown are merely examples and do not limit the invention to the combinations of binders and friction modifiers shown therein. Examples 1-5, shown in Table 1, include coefficient of friction (COF) results for particular friction modifier and binder combinations. In order to determine the coefficient of friction, the antifriction coating materials are subject to a sliding wear test as known in the art. The tests were conducted with a stroke length of 0.150 inches, at room temperature. Antifriction coating material (i.e., binder and friction modifier) was applied to a thickness of 0.001 inch onto the wear surfaces.

The wear surfaces were then subject to a load of 50 lbs. and tested for up to 1 million cycles over a wide temperature range. The coefficients of friction were measured at various temperatures during the test and an average coefficient (i.e., Avg COF) of friction was calculated as the coefficient of friction for the wear system.

TABLE 1

| Ex. | Binder | Friction Modifier | COF Initial | COF room temp. | COF at 400° F. | COF at 750° F. | Avg COF |
|---|---|---|---|---|---|---|---|
| 1 | titanium oxide | tungsten sulfide | 0.2 | 0.5 | 0.4 | 0.6 | 0.43 |
| 2 | titanium oxide | bismuth telluride | 0.3 | 0.7 | 0.7 | 0.6 | 0.58 |
| 3 | titanium oxide | bismuth oxide | 0.2 | 0.7 | 0.7 | 0.6 | 0.55 |
| 4 | titanium oxide | copper sulfide | 0.3 | 0.6 | 0.7 | 0.6 | 0.55 |
| 5 | aluminum phosphate | tungsten sulfide | 0.3 | 0.4 | 0.5 | 0.5 | 0.43 |

The friction modifier is preferably incorporated into the binder in a quantity of about 10% to about 500% by weight. The friction modifier is incorporated into the binder material and is preferably encapsulated in the binder material. Encapsulation may take place using any suitable encapsulation method, including but not limited to powder metallurgical encapsulation methods. The binder incorporated with friction modifier is coated onto the surfaces subject to wear (i.e., wear surface). Suitable methods for coating include, but are not limited to, spraying or dipping the surface to be coated with an antifriction coating 504 and subsequently drying the antifriction coating 504. The dried surface forms an antifriction coating 504 that is tenacious and uniform across the wear surface. Optionally, the antifriction coating 504 may be heated during the drying step.

The end rod bearing structure of the present invention having the wear coating 502 and antifriction coating 504 combination preferably maintains a friction coefficient between the sliding surfaces of the rod end bearing 300 at or below about 0.6 over the entire operating range of a gas turbine engine. For example, a rod end bearing 300 for use in a variable stator vane assembly 200 may experience high altitude atmosphere substantially devoid of water vapor and temperatures up to 1200° F. More preferably, the rod end bearing 300 of the present invention maintains a friction coefficient between the sliding surfaces of below about 0.5 over the entire operating range of the end rod bearing. In particular, the antifriction coating 504 of the present invention preferably maintains a coefficient of friction of less than about 0.5 when in contact with the surface 506 of the wear coating or the surface 402 of the ball bearing 218 in a reciprocating motion under a load at temperatures up to 800° F. (427° C.).

When used in rod end bearings 300 of variable stator vane assemblies 200, the wear coating 502 and antifriction coating 504 combination on the ring portion 216 and the ball bearing 218 is resistant to wear over the entire operating range of the variable stator vane assembly 200, including the operational temperatures of the gas turbine engine and the high altitude atmospheres. In one embodiment of the present invention, the wear coating 502 and antifriction coating 504 combination, according to the present invention, wears less than about 0.005 inches over 2 million reciprocations (i.e., the number of times the surfaces are subject to rubbing friction) at temperatures up to about 800° F.

In another embodiment of the present invention, additives may be included in the antifriction coating 504 to provide additional desirable properties for the coating. The additional additive is an additive that provides desirable properties, such as increased lubricity, increased adhesion, or increased coating uniformity, to the composition. Suitable additional additives include, but are not limited to, polytetrafluoroethylene, adhesion promoters, dispersing agents, graphite, molybdenum sulfide, molybdenum diselenide, copper and combinations thereof.

The combination of the wear coating 502 and antifriction coating 504 of the present invention assure reduced coefficients of friction, in the range of about 0.2 to about 0.6, over the life of the system. Improvements in coefficient of friction permit the reduction in size, and hence weight of the actuation mechanism of the variable guide vanes, including the first and second lever arms 210 and 212.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rod end bearing comprising:
a body comprising a ring portion and a rod portion;
the ring portion comprising a ring having an opening and a center axis;
the rod portion comprising a first rod extending radially from the ring in a direction perpendicular to the center axis;
the opening having a geometry sufficient to support a ball bearing, and permitting rotation of the ball bearing inside the ring, the ball bearing being substantially spherical and being capable of attachment to a second rod;
an inner periphery of the ring being in contact with the ball bearing;
a wear coating on at least a portion of the inner periphery of the ring; and
an antifriction coating disposed on a surface selected from the group consisting of a surface of the wear coating, a surface selected from the group consisting of a surface of the wear coating, a surface of the ball bearing and combinations thereof, the antifriction coating maintaining a coefficient of friction between the wear coating and the ball bearing of up to about 0.95 atmospheres substantially devoid of water vapor.

2. The rod end bearing of claim 1, wherein the body comprises two or more parts, each of the parts being substantially planar plates, each plate including the rod portion and the ring portion, the two or more parts being fastened together supporting the ball bearing within the ring portion of the two or more parts and places the inner periphery of the ring portion of each of the parts in contact with the surface of the ball bearing.

3. The rode end bearing of claim 1, wherein the body comprises a material having a thermal coefficient of expansion greater than the thermal coefficient of expansion of the ball bearing.

4. The rod end bearing of claim 1, wherein the antifriction coating comprises a binder and a friction modifier.

5. The rod end bearing of claim 4, wherein the binder comprises a material selected from the group consisting of sodium silicate, aluminum phosphate, titanium oxide and combinations thereof.

6. The rod end bearing of claim 5, wherein the binder is titanium oxide.

7. The rod end bearing of claim 4, wherein the friction modifier comprises a material selected from the group consisting of tungsten sulfide, bismuth telluride, copper sulfide, bismuth oxide and combinations thereof.

8. The rod end bearing of claim 7, wherein the friction modifier is tungsten sulfide.

9. The rod end bearing of claim 1, wherein the ball bearing comprises a material selected from the group consisting of tungsten carbide, silicon nitride, zirconium oxide, cobalt-chromium-molybdenum alloys and combinations thereof.

10. The rod end bearing of claim 9, wherein the ball bearing comprises silicon nitride.

11. The rod end bearing of claim 1, wherein the wear coating comprises a material selected from the group consisting of tungsten carbide, cobalt-containing tungsten carbide, titanium nitride and combinations thereof.

12. The rod end bearing of claim 1, wherein the wear coating comprises cobalt-containing tungsten carbide.

13. The rod end bearing of claim 1, wherein the wear coating comprises titanium nitride.

14. The rod end bearing of claim 1, wherein the antifriction coating maintains a coefficient of friction between the wear coating and the ball bearing of equal to or less than 0.95 in atmospheres substantially devoid of water vapor.

15. The rod end bearing of claim 1, wherein the antifriction coating maintains a coefficient of friction between the wear coating and the ball bearing of equal to or less than 0.6 in atmospheres substantially devoid of water vapor.

16. The rod end bearing of claim 1, wherein the antifriction coating maintains a coefficient of friction between the wear coating and the ball bearing of equal to or less than 0.95 at temperatures greater than or equal to about 1000° F.

17. The rod end bearing of claim 1, wherein the antifriction coating maintains a coefficient of friction between the wear coating and the ball bearing of equal to or less than 0.6 at temperatures greater than or equal to about 1000° F.

18. The rod end bearing of claim 1, wherein the antifriction coating maintains a coefficient of friction between the wear coating and the ball bearing of equal to or less than 0.95 at temperatures greater than or equal to about 1200° F.

19. The rod end bearing of claim 1, wherein the antifriction coating maintains a coefficient of friction between the wear coating and the ball bearing of equal to or less than 0.6 at temperatures greater than or equal to about 1200° F.

20. The rod end bearing of claim 1, wherein the rod end bearing wears less than 0.005 inches over 2 million reciprocations of the ball bearing within the ring portion.

* * * * *